United States Patent
Onishi et al.

(10) Patent No.: US 9,386,251 B2
(45) Date of Patent: Jul. 5, 2016

(54) IMAGE PICKUP DEVICE, IMAGE PICKUP SYSTEM, AND METHOD OF DRIVING IMAGE PICKUP DEVICE IN WHICH COMPARISON START TIMES ARE CONTROLLED

(71) Applicant: CANON KABUSHIKI KAISHA, Tokyo (JP)

(72) Inventors: Tomoya Onishi, Ayase (JP); Takeru Ohya, Machida (JP); Daisuke Kobayashi, Kawaguchi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 156 days.

(21) Appl. No.: 13/904,312

(22) Filed: May 29, 2013

(65) Prior Publication Data

US 2013/0321684 A1 Dec. 5, 2013

(30) Foreign Application Priority Data

May 31, 2012 (JP) ................................ 2012-124833

(51) Int. Cl.
*H04N 5/235* (2006.01)
*H04N 5/335* (2011.01)
*H03M 1/00* (2006.01)
*H03M 1/56* (2006.01)
*H04N 5/378* (2011.01)
*H04N 5/3745* (2011.01)

(52) U.S. Cl.
CPC ........... *H04N 5/378* (2013.01); *H04N 5/37455* (2013.01)

(58) Field of Classification Search
None
See application file for complete search history.

(56) References Cited

U.S. PATENT DOCUMENTS

| | | | |
|---|---|---|---|
| 5,801,657 A * | 9/1998 | Fowler et al. | 341/155 |
| 2009/0200624 A1* | 8/2009 | Dai et al. | 257/432 |
| 2010/0157035 A1* | 6/2010 | Purcell et al. | 348/65 |
| 2013/0299674 A1* | 11/2013 | Fowler et al. | 250/208.1 |

FOREIGN PATENT DOCUMENTS

| | | |
|---|---|---|
| JP | 2004-015291 A | 1/2004 |
| JP | 2006-129298 A | 5/2006 |
| JP | 2009-118035 A | 5/2009 |
| JP | 2009-130799 A | 6/2009 |
| JP | 2009-290000 A | 12/2009 |

* cited by examiner

*Primary Examiner* — Aung S Moe
*Assistant Examiner* — Euel Cowan
(74) *Attorney, Agent, or Firm* — Canon USA, Inc. IP Division

(57) ABSTRACT

Provided are an image pickup device, a method of driving the image pickup device, and an image pickup system, in which timings of starting operations in a plurality of comparison units to which power supply voltage is applied through a common line are controlled to be different.

20 Claims, 14 Drawing Sheets

FIG. 6A

| BLOCK 1(ST_1) |
| BLOCK 2(ST_2) |
| BLOCK 3(ST_3) |
| BLOCK 4(ST_4) |
| BLOCK 5(ST_5) |

FIG. 6B

| BLOCK 1 (ST_1) | BLOCK 2 (ST_2) | BLOCK 3 (ST_3) | BLOCK 4 (ST_5) | BLOCK 5 (ST_5) |

FIG. 6C

| ST_1 | ST_2 | ST_3 | ST_4 | ST_5 | ST_1 |
|------|------|------|------|------|------|
| ST_2 | ST_1 | ST_2 | ST_3 | ST_4 | ST_5 |
| ST_3 | ST_2 | ST_1 | ST_2 | ST_3 | ST_4 |
| ST_4 | ST_3 | ST_2 | ST_1 | ST_2 | ST_3 |
| ST_5 | ST_4 | ST_3 | ST_2 | ST_1 | ST_2 |

IMAGE PICKUP DEVICE, IMAGE PICKUP SYSTEM, AND METHOD OF DRIVING IMAGE PICKUP DEVICE IN WHICH COMPARISON START TIMES ARE CONTROLLED

BACKGROUND OF THE INVENTION

1. Field of the Invention

The present disclosure relates to an image pickup device including a photoelectric conversion unit and an analog-digital conversion unit that converts an analog signal into a digital signal.

2. Description of the Related Art

In the related art, an image pickup device including a photoelectric conversion unit that generates signal charges based on incident light, a plurality of analog-digital conversion units (hereinafter, an analog-digital conversion unit is referred to as an AD conversion unit) that convert an analog signal based on the signal charges into a digital signal, is known. In addition, an AD conversion unit that includes a comparison unit for outputting a comparison result signal obtained by comparing an analog signal with a reference signal, and converts the analog signal into a digital signal based on the comparison result signal, is known. As an example of the image pickup device including the plurality of AD conversion units, there is a type of an image pickup device provided with pixels including a photoelectric conversion unit in a matrix, in which AD conversion units are provided corresponding to columns of the pixels. In addition, in Japanese Patent Application Laid-Open No. 2006-129298, as another type of the image pickup device including the plurality of AD conversion units, an image pickup device in which pixels including a photoelectric conversion unit and an AD conversion unit are provided in a matrix, is disclosed.

SUMMARY OF THE INVENTION

An embodiment of the present invention has been made to solve the above problems, and according to one aspect of the invention, there is provided an image pickup device including: a plurality of pixels that each include a photoelectric conversion unit that generates signal charges, an analog signal output unit that outputs an analog signal based on the signal charges, and a plurality of analog-digital conversion units, each analog-digital conversion unit including a comparison unit for outputting a comparison result signal obtained by comparing the analog signal with a reference signal, and convert the analog signal into a digital signal based on the comparison result signal; and a control unit that controls timings of starting operations of comparing the analog signal with the reference signal to be different from each other in the plurality of comparison units to which power supply voltage is applied through a common line.

According to another aspect of the invention, there is provided an image pickup device including: a plurality of photoelectric conversion units that generate signal charges; a plurality of analog signal output units that are provided corresponding to the photoelectric conversion units, respectively, and output an analog signal based on the signal charges; and a plurality of analog-digital conversion units that are provided corresponding to the analog signal output units, respectively, include comparison units that output a comparison result signal obtained by comparing the analog signal with a reference signal, and convert the analog signal into a digital signal based on the comparison result signal, wherein the analog signal based on the signal charges generated by the plurality of photoelectric conversion units that have finished accumulation of the signal charges at the same timing is output from each of the plurality of analog signal output units to each of the plurality of comparison units, and wherein the image pickup device further comprise a control unit controls timings of starting operations of comparing the analog signal with the reference signal to be different from each other in the plurality of comparison units to which power supply voltage is applied through a common line.

According to still another aspect of the invention, there is provided a method of driving an image pickup device that includes a plurality of pixels each including a photoelectric conversion unit that generates signal charges, an analog signal output unit that outputs an analog signal based on the signal charges, and a plurality of analog-digital conversion units, each analog-digital conversion unit including a comparison unit for outputting a comparison result signal obtained by comparing the analog signal with a reference signal, and convert the analog signal into a digital signal based on the comparison result signal, wherein timings of starting operations of comparing the analog signal with the reference signal are controlled to be different among the plurality of comparison units to which power supply voltage is applied through a common line.

Further features of the present invention will become apparent from the following description of exemplary embodiments (with reference to the attached drawings).

BRIEF DESCRIPTION OF THE DRAWINGS

FIG. 6A is a schematic diagram illustrating an example of disposition of blocks;

FIG. 6B is a schematic diagram illustrating another example of disposition of blocks;

FIG. 6C is a schematic diagram illustrating another example of disposition of blocks;

DESCRIPTION OF THE EMBODIMENTS

In the image pickup device described in the related art, when a signal value of the comparison result signal output from the comparison unit is changed, current flows through a line for applying potential to the comparison unit. Accordingly, potential of the line for applying potential to the comparison unit may fluctuate. In an operation of the image pickup device in which the lines for applying potential to the comparison units of the plurality of AD conversion units are commonly connected, the comparison units of the plurality of AD conversion units may simultaneously start an operation. In this case, fluctuation in potential may occur in the lines for applying potential to the plurality of comparison units due to the change of the comparison result signal of any comparison unit, and precision in operation of other comparison units may decrease. The image pickup device described in the following embodiments is provided to solve the problem.

Embodiment 1

Hereinafter, an image pickup device according to an embodiment will be described with reference to the drawings.

Figure 1:
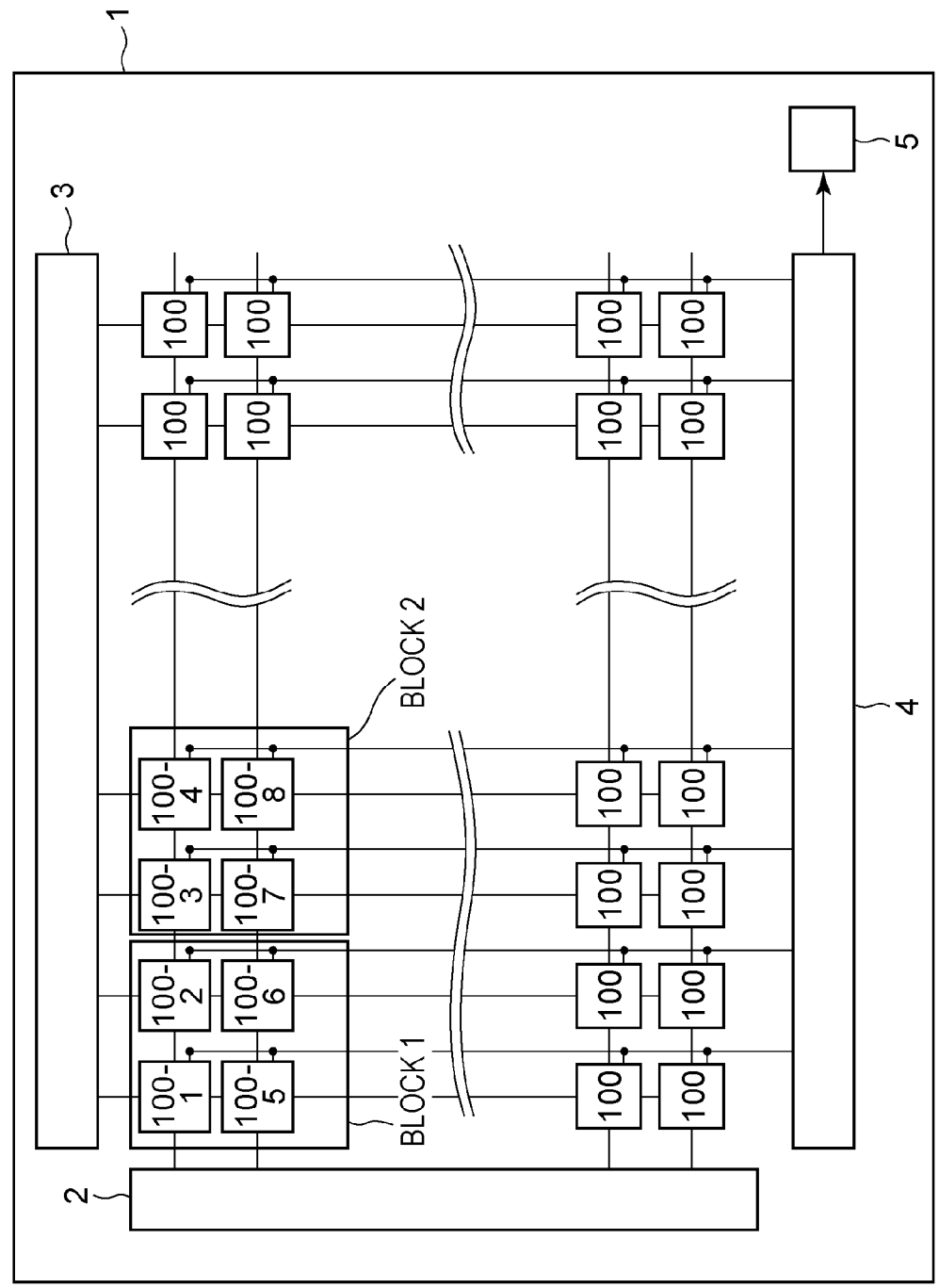
FIG. 1 is a schematic diagram illustrating an example of a configuration of an image pickup device.

FIG. 1 is a block diagram illustrating an example of an image pickup device of the embodiment. In the image pickup device 1 of the embodiment, pixels 100 are disposed in a matrix. To the pixels 100 included in a block 1 and a block 2, reference numerals 100-1 to 100-4 are given as branch numbers in order from the first column as viewed from a vertical scanning circuit 2 in the first row as viewed from an AD signal supply unit 3. Hereinafter, in the specification, when the pixels 100 are represented merely by the M-th row (M is an integer equal to or more than 1), it is considered as counting from the AD signal supply unit 3. In addition, when the pixels 100 are represented merely by the N-th column (N is an integer equal to or more than 1), it is considered as counting from the vertical scanning circuit 2. To the second row pixels 100 included in the block 1 and the block 2, reference numerals 100-5 to 100-8 are given in order from the first column similarly to the first row pixels. The vertical scanning circuit 2 selects the pixels 100 for each row. In addition, the AD signal supply unit 3 supplies a clock signal CLK, a ramp signal RAMP, an AD start signal ST that is a start signal of starting an AD conversion operation, to the pixel 100. In the embodiment, the AD signal supply unit 3 is a control unit that controls timings of starting operation of the plurality of comparison units 7 to be different from each other. The pixels 100-1, 100-2, 100-5, and 100-6 belong to the block 1 to which the AD signal supply unit 3 transmits the first AD start signal ST_1. The pixels 100-3, 100-4, 100-7, and 100-8 belong to the block 2 to which the AD signal supply unit 3 transmits the second AD start signal ST_2. The pixel signal reading unit 4 sequentially outputs the signals output from the pixels 100, to the external output unit 5. The first AD start signal ST_1 and the second AD start signal ST_2 are transmitted from the AD signal supply unit 3 to the block 1 and the block 2 through different signal lines, respectively. That is, the AD signal supply unit 3 is electrically connected to the block 1 by the first signal line for transmitting the first AD start signal ST_1. In addition, the AD signal supply unit 3 is electrically connected to the block 2 by the second signal line, which is provided separately from the first signal line, for transmitting the second AD start signal ST_2. The block 1 and the block 2 are the first block and the second block, respectively, in the embodiment. The pixels 100-1 and 100-2 of the block 1 are electrically connected to the AD signal supply unit 3 through different signal lines, but the same AD start signal ST_1 is supplied in the embodiment. When the pixels 100-1 and 100-2 are individual blocks, the individual AD start signals ST may be supplied to the pixel 100-1 and the pixel 100-2.

Figure 2:
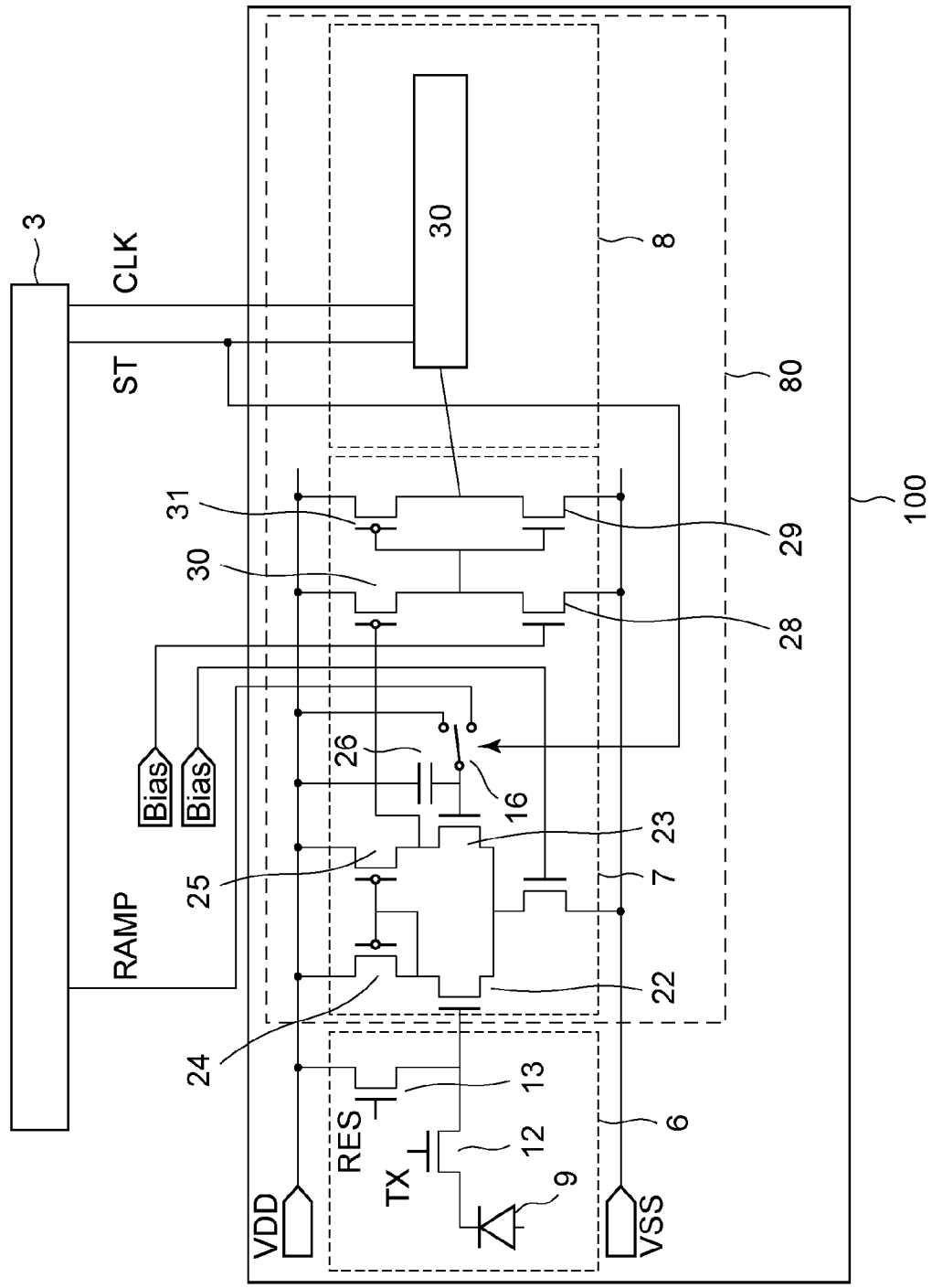
FIG. 2 is a schematic diagram illustrating an example of a configuration of a pixel.

FIG. 2 is a schematic diagram illustrating an example of a pixel 100 of the embodiment. The analog signal output unit 6 includes a photoelectric conversion unit 9, a transfer MOS transistor 12, and a reset MOS transistor 13. When a transmission signal TX is in a high level (hereinafter, the high level is referred to as an H level, and the low level is referred to as an L level), the transfer MOS transistor 12 transmits the signal charges generated by the photoelectric conversion unit 9 to a control electrode of the input MOS transistor 22 of a comparison unit 7. The control electrode of the input MOS transistor 22 is an analog signal holding unit of the embodiment. When a reset signal RES is in the H level, the reset MOS transistor 13 resets potential of the control electrode of the input MOS transistor 22 of the comparison unit 7. The control electrode of the input MOS transistor 22 is a charge holding unit that holds signal charges of the embodiment.

The comparison unit 7 includes an input MOS transistor 22, and a selection switch 16. The selection switch 16 is a switch that connects the control electrode of a MOS transistor 23 to any one of a power supply voltage VDD and a ramp signal RAMP. In addition, a capacitor 26 is provided between the control electrode of the MOS transistor 23 and the power supply voltage VDD. The power supply voltage VDD is commonly connected to the reset MOS transistor 13 and PMOS transistors 24, 25, 30, and 31. In addition, a voltage VSS is commonly connected to NMOS transistors 27, 28, and 29. The power supply voltages VDD and VSS are commonly connected to the pixels 100 in a plurality of blocks.

The memory unit 8 includes a counter 30. The AD signal supply unit 3 supplies the clock signal CLK to the counter 30. In addition, the AD signal supply unit 3 supplies the AD start signal ST to the counter 30. When the AD start signal ST is in the H level, the counter 30 generates a count signal CNT obtained by counting the clock signal CLK. In addition, the counter 30 holds the count signal when a signal value of the comparison result signal CMP output from a comparison unit 7 is changed. An AD conversion unit 80 includes the comparison unit 7 and the memory unit 8.

The AD signal supply unit 3 of the embodiment controls conversion of the selection switch 16, and the counter 30. When the AD start signal ST supplied by the AD signal supply unit 3 is in the H level, the selection switch 16 electrically connects the control electrode of the MOS transistor 23 to the ramp signal RAMP. In addition, when the AD start signal ST is in the H level, the reset operation of the counter 30 is released, and the counting of the clock signal CLK is started. Accordingly, the AD conversion operation of converting the analog signal based on the signal charges generated by the photoelectric conversion unit 9 into the digital signal is started.

Figure 3:
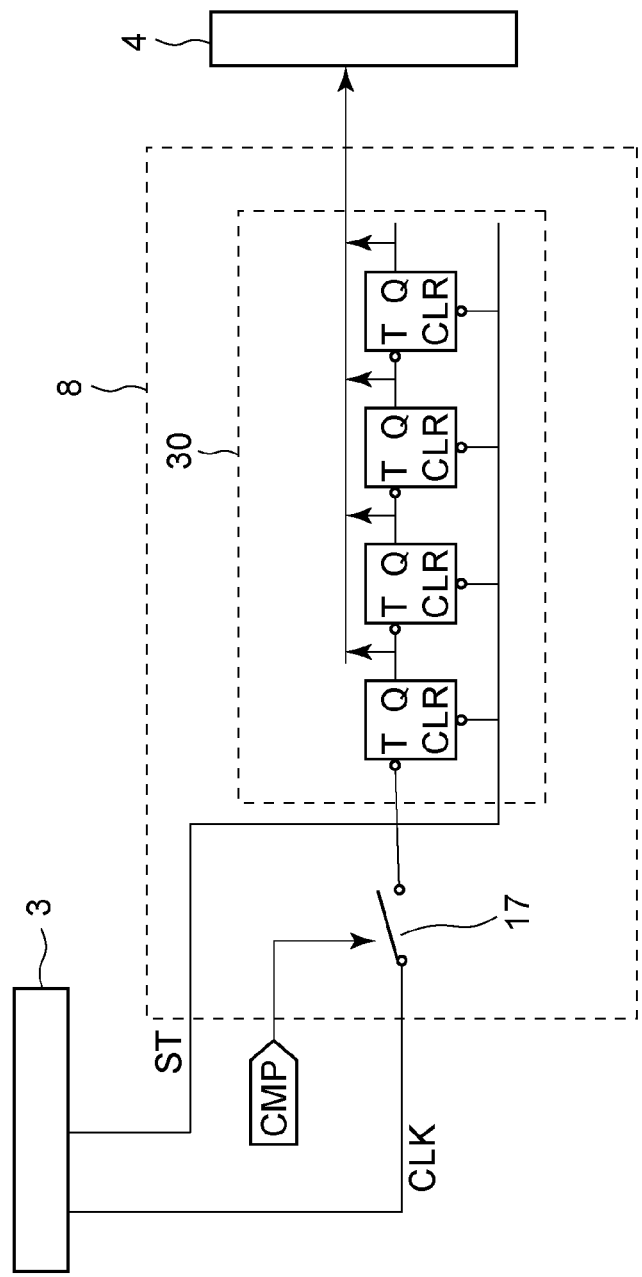
FIG. 3 is a schematic diagram illustrating an example of a configuration of a memory unit.

FIG. 3 illustrates an example of a configuration of the counter 30. The counter 30 exemplified in FIG. 3 is provided with a plurality of T-type flip-flop circuits. The AD start signal ST is supplied from the AD signal supply unit 3 to a reset terminal of each flip-flop circuit. When the AD start signal ST is in the L level, each flip-flop circuit is reset. The switch 17 is in a conducting state when the signal value of the comparison result signal CMP is in the L level, and the clock signal CLK is input to the flip-flop circuit. In addition, the switch 17 is in a non-conducting state when the signal value of the comparison result signal CMP is in the H level, and the clock signal CLK is not input to the flip-flop circuit. Each flip-flop circuit holds the signal value of the timing at which the switch 17 is changed from the conducting state to the non-conducting state when the AD start signal ST is in the H level. That is, the counter 30 holds the count signal when the signal value of the comparison result signal CMP output from the comparison unit 7 is changed.

Figure 4:
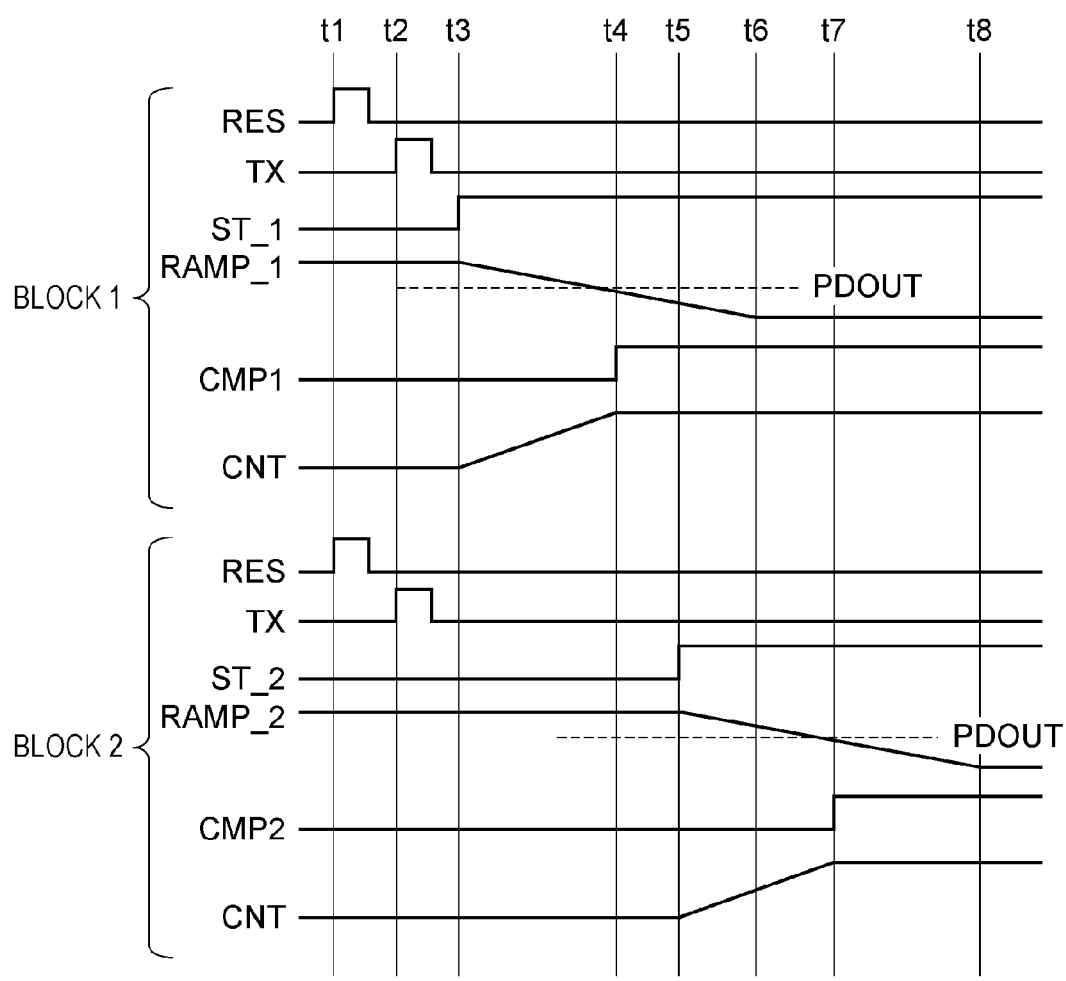
FIG. 4 is a timing chart illustrating an example of an operation of the image pickup device.

Next, an operation of the image pickup device exemplified in FIG. 1 will be described with reference to FIG. 4. A block 1 and a block 2 illustrated in FIG. 4 correspond to the block 1 and the block 2 of the pixels 100 of the image pickup device exemplified in FIG. 1, respectively.

At the time t1, in the vertical scanning circuit 2, the reset signal RES supplied to the pixels 100 of the block 1 and the block 2 is in the H level, and the potential of the control electrode of the input MOS transistor 22 is reset. Thereafter, the reset signal RES is in the L level.

In a period from when the reset signal RES is in the L level to the time t2, the photoelectric conversion unit 9 generates signal charges based on incident light.

At the time t2, the transmission signal TX supplied to the pixels 100 of the block 1 and the block 2 is in the H level, and then is in the L level. Accordingly, the signal charges generated by the photoelectric conversion unit 9 are transmitted to the control electrode of the input MOS transistor 22. In the image pickup device of the embodiment, the plurality of pixels 100 of the image pickup device 1 may simultaneously complete the accumulation of the signal charges of the photoelectric conversion unit 9 at the time t2.

At the time t3, the AD signal supply unit 3 allows the AD start signal ST_1 supplied to the pixel 100 of the block 1 to be in the H level. Accordingly, the AD signal supply unit 3 starts changing the potential depending on the time of the ramp signal RAMP_1 supplied to the pixel 100 of the block 1. In addition, the memory unit 8 of the pixel 100 of the block 1 counts the clock signal CLK, and starts generating the count signal CNT.

For example, at the time t4, a magnitude relation between potential PDOUT of the control electrode of the input MOS transistor 22 of the pixel 100-1 and potential of the control electrode of the MOS transistor 23 is reversed. Then, the signal value of the comparison result signal CMP1 output from the comparison unit 7 of the pixel 100-1 is changed from the L level to the H level. The memory unit 8 of the pixel 100-1 holds the count signal CNT at the time t4. Also for other pixels 100 included in the block 1, when a magnitude relation between the potential of the control electrode of the input MOS transistor 22 and the potential of the control electrode of the MOS transistor 23 is reversed, the signal value of the comparison result signal CMP is changed from the L level to the H level. The memory unit 8 of each pixel 100 of the block 1 holds the signal value of the count signal CNT when the signal value of the comparison result signal CMP is changed from the L level to the H level.

At the time t5, the AD signal supply unit 3 allows the AD start signal ST_2 supplied to the pixel 100 of the block 2 to be in the H level. Accordingly, the AD signal supply unit 3 starts changing the potential depending on the time of the ramp signal RAMP_2 supplied to the pixel 100 of the block 2. In addition, the memory unit 8 of the pixel 100 of the block 2 counts the clock signal CLK, and starts generating the count signal CNT.

Herein, at the time t6, the AD signal supply unit 3 stops changing the potential depending on the time of the ramp signal RAMP_1 supplied to the pixel 100 of the block 1. The AD conversion period of the block 1 is a period from the time t3 to the time t6.

For example, at the time t7, a magnitude relation between the potential PDOUT of the control electrode of the input MOS transistor 22 of the pixel 100-3 and the potential of the control electrode of the MOS transistor 23 is reversed. Then, the signal value of the comparison result signal CMP2 output from the comparison unit 7 of the pixel 100-3 is changed from the L level to the H level. The memory unit 8 of the pixel 100-3 holds the count signal CNT at the time t7. Also for other pixels 100 included in the block 2, when a magnitude relation between the potential of the control electrode of the input MOS transistor 22 and the potential of the control electrode of the MOS transistor 23 is reversed, the signal value of the comparison result signal CMP is changed from the L level to the H level. The memory unit 8 of each pixel 100 of the block 2 holds the signal value of the count signal CNT when the signal value of the comparison result signal CMP is changed from the L level to the H level.

At the time t8, the AD signal supply unit 3 stops changing the potential depending on the time of the ramp signal RAMP_2 supplied to the pixel 100 of the block 2. The AD conversion period of the block 2 is a period from the time t5 to the time t8.

After the time t8, the pixel signal reading unit 4 sequentially outputs the count signal CNT held by the memory unit 8 of each pixel 100, from the memory unit 8 of each pixel 100, and sequentially transmits the count signal CNT to the external output unit 5.

In the comparison unit 7, current flows between the power supplies by the change of the signal value of the comparison result signal. Since the line for supplying the power supply voltage VDD has a resistance value, the current flows, and the potential of the power supply voltage VDD may fluctuate. When the line for supplying the power supply voltage VDD to the comparison unit 7 and the line for supplying the ramp signal RAMP to the comparison unit 7 are disposed closely, the following problem occurs. There is parasitic capacitance between the line for supplying the power supply voltage VDD to the comparison unit 7 and the line for supplying the ramp signal RAMP. The fluctuation of the potential of the power supply voltage VDD may cause fluctuation of the potential of the ramp signal RAMP through the parasitic capacitance. The fluctuation of the potential of the ramp signal RAMP decreases precision of the AD conversion. In addition, when the power supply voltage VDD is commonly and electrically connected to the analog signal output unit 6 and the comparison unit 7, the signal precision of the analog signal output unit 6 is decreased by the fluctuation of the power supply voltage VDD generated in the comparison unit 7.

In the image pickup device of the embodiment, the AD signal supply unit 3 supplies the signals such that the timings when the signal value of the AD start signal ST is changed from the L level to the H level are different in the blocks adjacent to each other. Accordingly, the timings of starting the AD conversion in the blocks adjacent to each other are different. Therefore, as compared with the case of simultaneously starting the AD conversion in all the pixels 100, it is difficult to align the timing of changing the signal value of the comparison result signal CMP of each pixel 100. Accordingly, it is possible to reduce the fluctuation of the potential of the power supply voltage VDD caused by the change of the signal value of the comparison result signal CMP.

In the embodiment, a part of the AD conversion period of the block 1 overlaps with a part of the AD conversion period of the block 2. In the embodiment, the AD conversion periods of two blocks may not overlap at all. For example, in FIG. 4, the AD conversion period of the block 1 is completed, and then the AD conversion period of the block 2 may be started after the time t6. In this case, as compared with the image pickup device performing the operation illustrated in FIG. 4, it is further difficult to align the timing of changing the signal value of the comparison result signal CMP of each pixel 100. Accordingly, it is possible to reduce the fluctuation of the potential of the power supply voltage VDD caused by the change of the signal value of the comparison result signal CMP. As a result, it is possible to suppress the decrease of the operational precision of other comparison units, even when the potential of the line applying the common potential to the other comparison units fluctuates, by the change of the comparison result signal of any comparison unit. In addition, although the timing when the AD start signal ST_2 is in the H level is before the time t4, it is possible to obtain the same effect.

In addition, in the embodiment, the ramp-type AD conversion using the ramp signal RAMP has been described as an example. The embodiment is not limited to this type. As a type of the other AD conversion having the comparison unit, for example, there are sequential-comparison-type and pipeline-type AD conversion. Even in such a type, the timings of starting the AD conversion may be different among the plurality of pixels 100. The case where the timings of starting the AD conversion are different may not be in the type in which the AD start signals ST having the signal values changed from the L level to the H level at different timings are supplied to the plurality of comparison units 7. For example, there is an AD conversion unit outputting the comparison result signal when a reference signal is given in advance to one input section of the comparison unit 7 and an analog signal is input to another input section. In this type, the timings when the analog signals are input to the input terminals of the comparison units 7 of the plurality of pixels 100 may be different. For this purpose, for example, the vertical scanning circuit 2 allows the timings when the signal value of the transmission signal TX is changed from the L level to the H level to be different from each other in the plurality of pixels 100. In this case, the control unit that allows the timings of starting the operations of the plurality of comparison units 7 to be different from one another is the vertical scanning circuit 2. That is, in the embodiment, the plurality of AD conversion units including the comparison unit that compares the analog signal with the reference signal may be provided, and the timings of starting the operations in the plurality of comparison units may be different. However, as compared with the ramp-type AD conversion, in the sequential-comparison-type and pipeline-type AD conversion in which the signal values of the comparison result signals of the comparison units are changed many times by one AD conversion, it is difficult to disperse the fluctuation of the potential of the power supply voltage VDD caused by the change of the signal value of the comparison result signal. The AD signal supply unit 3 supplies the AD start signal ST in which the timings of being in the H level are different in the plurality of pixels 100, and the fluctuation of the potential of the power supply voltage VDD is thereby reduced. This effect tends to be significant in the ramp-type AD conversion as compared with the sequential-comparison-type and pipeline-type AD conversion.

Figure 5:
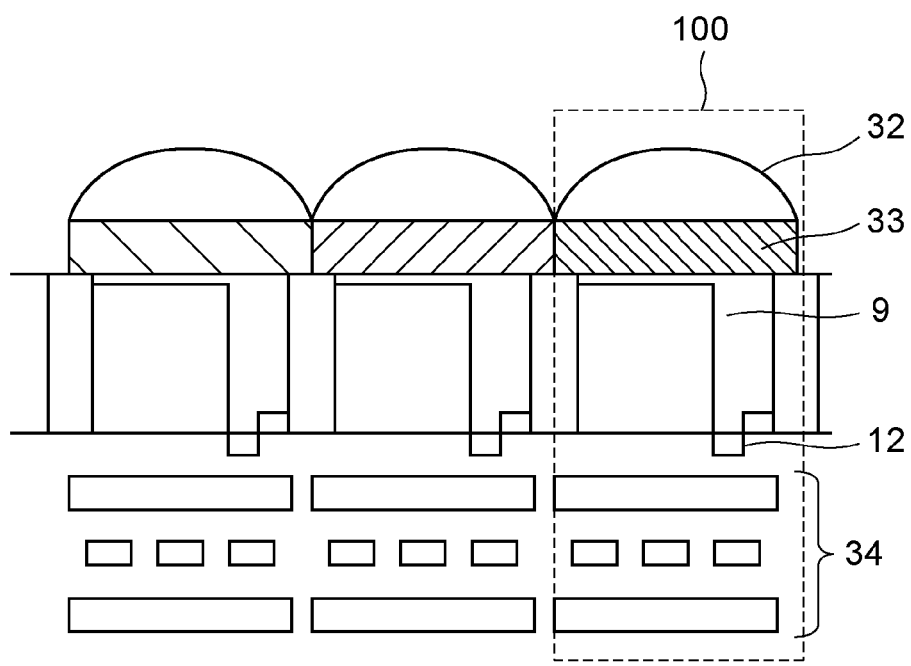
FIG. 5 is a cross-sectional view illustrating an example of the image pickup device.

As a type of an image pickup device in which a pixel 100 has a comparison unit 7 and a memory unit 8, there is a so-called back face irradiation-type image pickup device. A cross-sectional view of the pixel 100 of an example of the back face irradiation-type image pickup device is illustrated in FIG. 5. In FIG. 5, the same reference numerals are given to the members having the same function as the pixel 100 illustrated in FIG. 2. In FIG. 5, light input to a microlens 32 is input to a photoelectric conversion unit 9 through a color filter 33. A wiring layer 34 is provided on the opposite side to the microlens 32 as viewed from the photoelectric conversion unit 9. The wiring layer 34 includes the AD conversion unit 80. That is, the photoelectric conversion unit 9 is provided between the microlens 32 and the AD conversion unit 80. In the back face irradiation-type image pickup device, the pixel 100 having the comparison unit 7 and the memory unit 8 may be configured while suppressing reduction of a light receiving area of the photoelectric conversion unit 9.

The type in which each block has the plurality of pixels 100 has been described, but one block may be formed of one pixel 100.

In the embodiment, at the time t2, the transmission signals TX supplied to the block 1 and the block 2 are in the H level. As well as such blocks, in all the pixels 100, the transmission signals TX may be simultaneously in the H level. In this type, it is possible to realize a so-called global electronic shutter in which a period when the signal charges of all the pixels are accumulated is aligned. Even in the type of the global electronic shutter, the timings of starting the comparison between the analog signal and the reference signal by the plurality of comparison units 7 to which the common power supply voltage VDD is supplied may be different.

In addition, in the embodiment, the type in which the pixel 100 has the AD conversion unit 80, and the AD signal supply unit 3 supplies the AD start signal ST to the plurality of pixels 100 has been described. The embodiment is not limited to the type, and the AD conversion unit 80 may be provided outside the pixel 100. For example, it may be embodied even in a type in which the AD conversion unit 80 is a column-parallel-type AD conversion unit provided corresponding to a column in which the pixels 100 are disposed. In the type of the column-parallel-type AD conversion unit, an analog signal based on the signal charges generated by the plurality of photoelectric conversion units completing accumulation of the signal charges at the same timing is given to the comparison units of each column. A type in which the timings of starting the operation of comparing the analog signal with the reference signal are different among the plurality of comparison units to which the power supply voltage is applied through the common line is preferable.

Embodiment 2

The disposition of the plurality of blocks in which the timings when the AD starts signal ST is in the H level are different is not limited to only the type of FIG. 1. Other examples of a type of dividing the pixels 100 into a plurality of blocks are illustrated in FIGS. 6A, 6B, and 6C. FIG. 6A is a type in which the blocks 1 to 5 include the pixels 100 belonging to rows different from each other. In other words, it is a type in which the pixels 100 arranged in the horizontal scanning direction belong to the same block. FIG. 6B is a type in which the blocks 1 to 5 include the pixels 100 belonging to columns different from each other. In other words, it is a type in which the pixels 100 arranged in the vertical scanning direction belong to the same block. Both types of FIGS. 6A and 6B are a type in which the AD signal supply unit 3 supplies the AD start signals ST in which the signal values are changed from the L level to the H level at different timings, to the blocks 1 to 5. In FIGS. 6A and 6B, the AD start signals ST supplied by the AD signal supply unit 3 are represented in parentheses after each block name. That is, the AD signal supply unit 3 supplies the AD start signal ST supplied to each block such that the timings when the signal values are changed from the L level to the H level are different. However, in the AD signal supply unit 3, it is not necessary that the timings when the signal values are changed from the L level to the H level are different from each other in all the AD start signals ST supplied to each block. That is, the AD signal supply unit 3 supplies the AD start signal ST_1 to the block 1, the block 3, and the block 5. In addition, the AD signal supply unit 3 may supply the AD start signal ST_2 in which the signal value is changed from the L level to the H level to the block 2 and the block 4 at the timing different from that of the AD start signal ST_1. That is, the AD signal supply unit 3 may supply the AD start signal ST in which the signal value is changed from the L level to the H level to the blocks adjacent to each other at different timings.

FIG. 6C is a type in which the AD signal supply unit 3 supplies the AD start signal ST different from that of the first block to the second block disposed in the column and the row near the first block having the plurality of pixels 100. In FIG. 6C, the AD start signals ST supplied to each block by the AD signal supply unit 3 are illustrated. In the type of FIG. 6C, the blocks to which the AD start signal ST in which the signal value is changed from the L level to the H level at the timing different from that of the AD start signal ST_1 is supplied are disposed in the row and the column near the blocks to which the AD start signal ST_1 is supplied. In any type of FIGS. 6A, 6B, and 6C, in the AD signal supply unit 3, the second block is disposed in the row or the column near the first block. The AD signal supply unit 3 allows the timings when the signal value of the supplied AD start signal ST is changed from the L level to the H level to be different between the first block and the second block. As described above, as illustrated in FIGS. 6A, 6B, and 6C, the AD signal supply unit 3 supplies the AD start signal ST being in the H level at the different timings to the blocks adjacent to each other. Accordingly, it is possible to allow the plurality of pixels 100 included in different blocks not to be easily affected by the fluctuation of the power supply voltage VDD caused by the change of the signal value of the comparison result signal CMP.

Next, as illustrated in FIG. 6C, an example of a type in which the AD signal supply unit 3 supplies the AD start signal ST being in the H level at the timings different from each other to the block adjacent to each other will be described with reference to FIG. 7.

Figure 7:
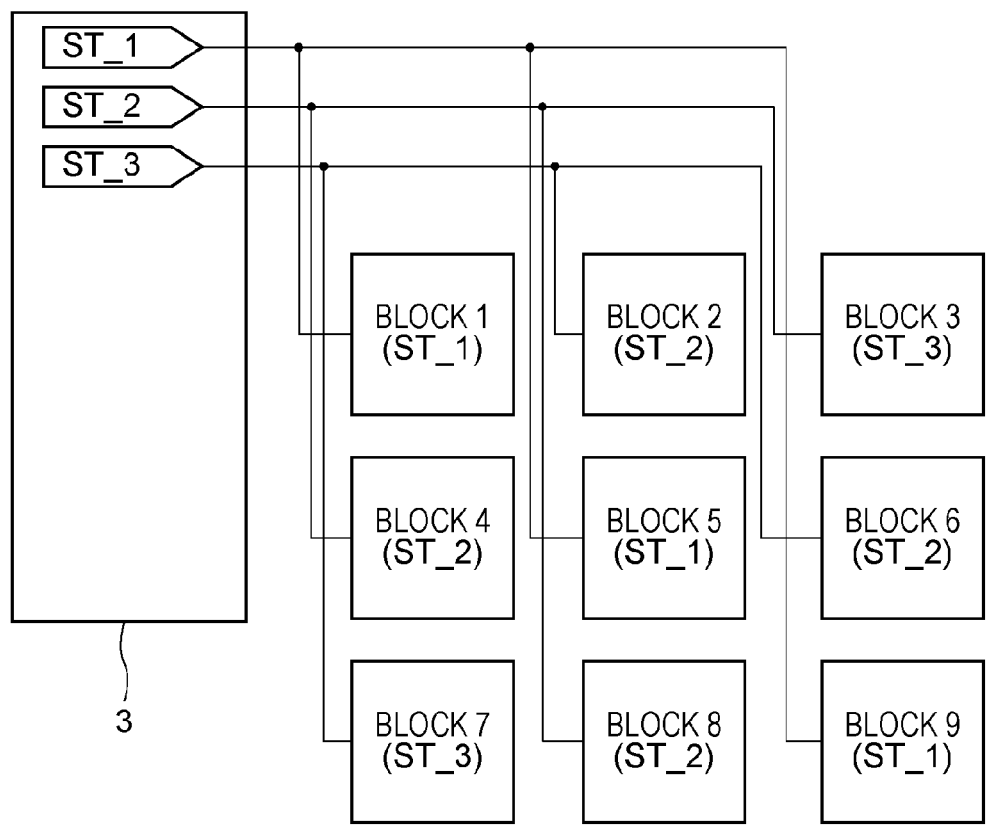
FIG. 7 is a schematic diagram illustrating an example of disposition of blocks and AD start pulses supplied to the blocks.

FIG. 7 illustrates nine extracted blocks in an area surrounded by the broken line of FIG. 6C. The AD signal supply unit 3 outputs the AD start signal ST_1 to the block 1, the block 5, and the block 9. Similarly, the AD signal supply unit 3 outputs the AD start signal ST_2 to the block 3, the block 4, and the block 8. Similarly, the AD signal supply unit 3 outputs the AD start signal ST_3 to the block 2, the block 6, and the block 7. With such a configuration, the AD signal supply unit 3 may supply the AD start signals ST being in the H level at the timings different from each other to the blocks adjacent to each other.

Figure 8:
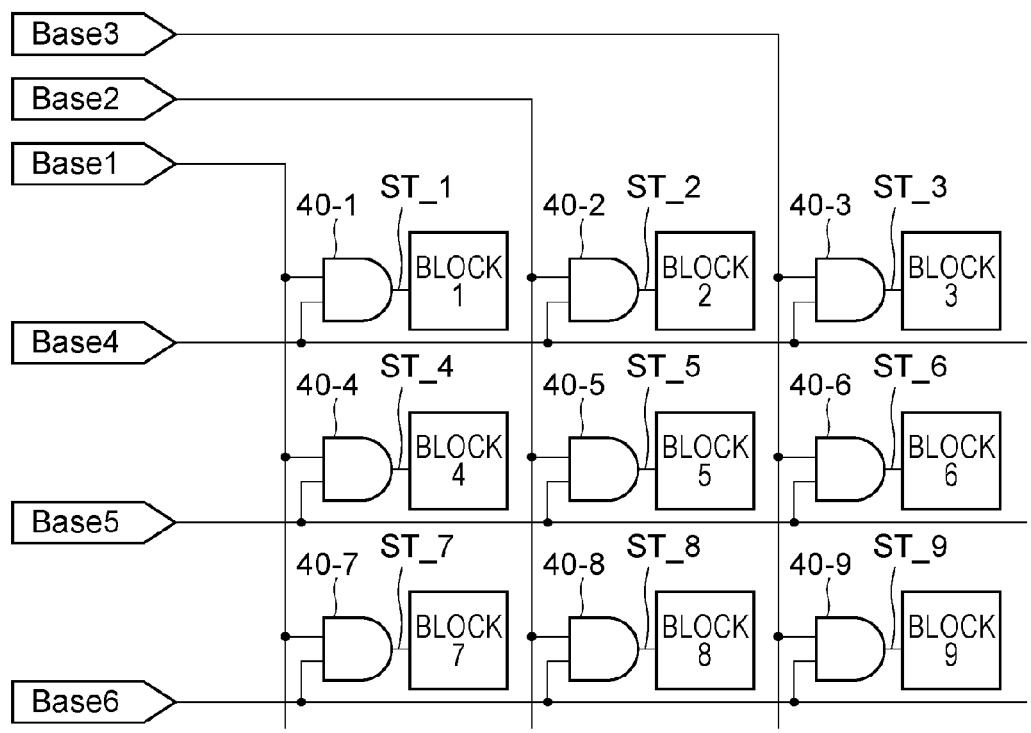
FIG. 8 is a schematic diagram illustrating an example of disposition of blocks and AD start pulses supplied to the blocks.

In FIG. 7, a type in which three AD start signals ST are supplied to nine blocks is illustrated. FIG. 8 illustrates a type in which nine AD start signals ST corresponding to nine blocks, respectively, are supplied.

In the type of FIG. 8, the AD signal supply unit 3 outputs AD start reference signals Base1 to Base6 that are bases of the AD start signals ST. AND circuits 40-1 to 40-9 are provided on paths from the AD signal supply unit 3 to the blocks 1 to 9, respectively. The AD signal supply unit 3 supplies the AD start reference signals Base1 and Base4 to the AND circuit 40-1. The AND circuit 40-1 outputs the AD start signal ST_1 to the block 1, as a logical sum of the AD start reference signals Base1 and Base4. Similarly, the AND circuit 40-2 outputs the AD start signal ST_2 to the block 2, as a logical sum of the AD start reference signals Base2 and Base4 output from the AD signal supply unit 3. The same is applied to the other AND circuits 40-3 to 40-9. That is, as illustrated in FIG. 8, the logical sum of any one of the AD start reference signals Base1 to Base3 and any one of the AD start reference signals Base4 to Base6, among the AD start reference signals Base1 to Base6, are output to each of the blocks 4 to 9.

Figure 9:
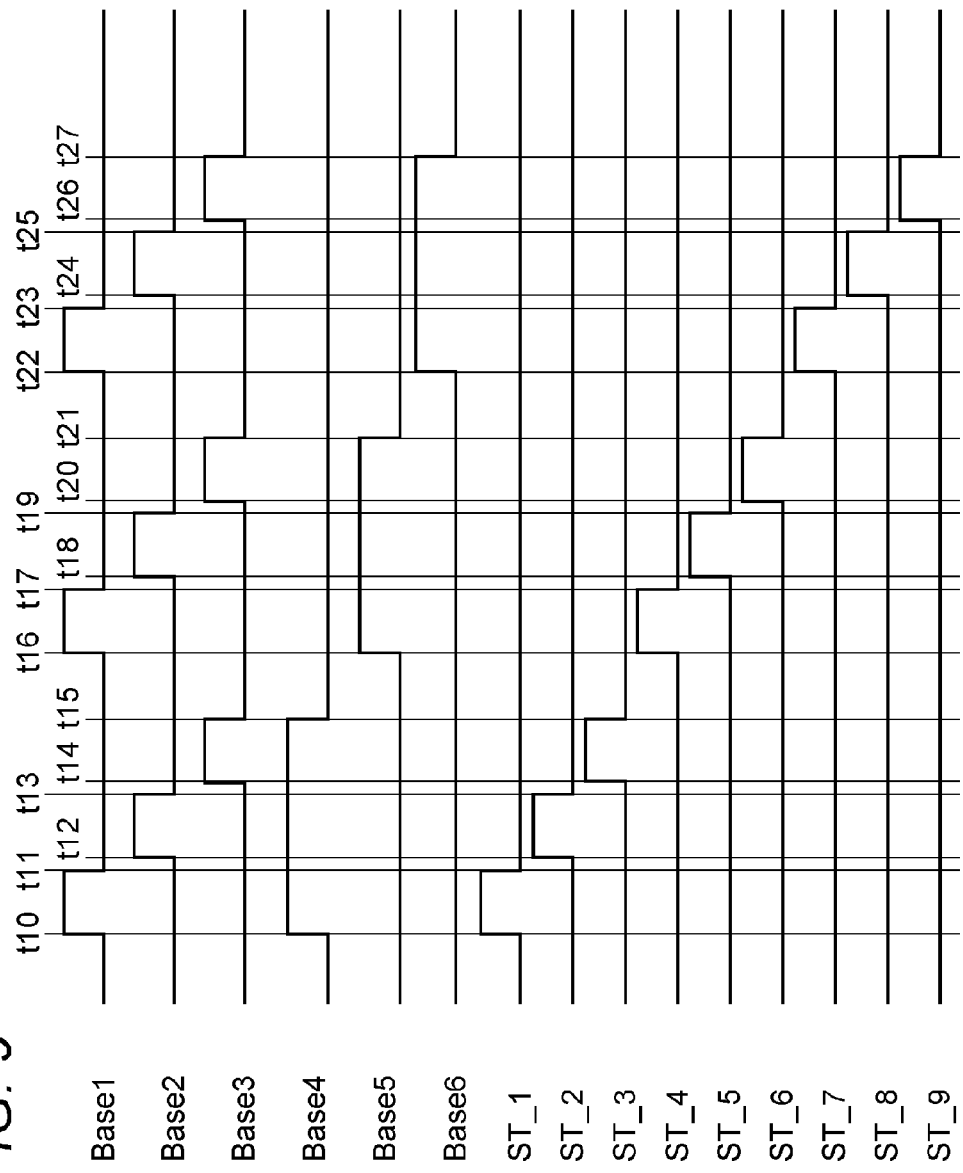
FIG. 9 is a timing chart illustrating an example of timings of the AD start pulses.

Next, FIG. 9 illustrates the timings of the AD start reference signals Base1 to Base6 and the AD start reference signals ST1 to ST6 in the type illustrated in FIG. 8.

The AD signal supply unit 3 allows the AD start reference signal Base1 to be in the H level at each period from the time t10 to the time t11, from the time t16 to the time t17, and from the time t22 to the time t23. The AD signal supply unit 3 allows the AD start reference signal Base2 to be in the H level at each period from the time t12 to the time t13, from the time t18 to the time t19, and from the time t24 to the time t25. The AD signal supply unit 3 allows the AD start reference signal Base3 to be in the H level at each period from the time t14 to the time t15, from the time t20 to the time t21, and from the time t26 to the time t27. The AD signal supply unit 3 allows the AD start reference signal Base4 to be in the H level in a period from the time t10 to the time t15. The AD signal supply unit 3 allows the AD start reference signal Base5 to be in the H level in a period from the time t16 to the time t21. The AD signal supply unit 3 allows the AD start reference signal Base6 to be in the H level in a period from the time t22 to the time t27.

Accordingly, the AD start signal ST_1 output from the AND circuit 40-1 to the block 1 is in the H level in a period from the time t10 to the time t11. The AD start signal ST_2 output from the AND circuit 40-2 to the block 2 is in the H level in a period from the time t12 to the time t13. The AD start signal ST_3 output from the AND circuit 40-3 to the block 3 is in the H level in a period from the time t14 to the time t15. The AD start signal ST_4 output from the AND circuit 40-4 to the block 4 is in the H level in a period from the time t16 to the time t17. The AD start signal ST_5 output from the AND circuit 40-5 to the block 5 is in the H level in a period from the time t18 to the time t19. The AD start signal ST_6 output from the AND circuit 40-6 to the block 6 is in the H level in a period from the time t20 to the time t21. The AD start signal ST_7 output from the AND circuit 40-7 to the block 7 is in the H level in a period from the time t22 to the time t23. The AD start signal ST_8 output from the AND circuit 40-8 to the block 8 is in the H level in a period from the time t24 to the time t25. The AD start signal ST_9 output from the AND circuit 40-9 to the block 9 is in the H level in a period from the time t26 to the time t27.

As described above, the corresponding nine AD start signals ST may be supplied to nine blocks, respectively.

In addition, the blocks may be divided as follows. It is assumed that there is an area where the brightness is substantially the same in the pixels 100 adjacent to each other in an image generated using a signal output from the image pickup device in advance. When the comparison units 7 of the pixels 100 with substantially the same brightness simultaneously start the AD conversion, the signal value of the comparison result signal CMP is changed at substantially the same timing. In addition, when the brightness is substantially the same in the pixels 100 adjacent to each other, it is easy to amplify the fluctuation of the potential of the power supply voltage VDD caused by simultaneously changing the signal values of the comparison result signals CMP. Accordingly, in the area where the brightness is substantially the same in the pixels 100 adjacent to each other, the pixels 100 in the area start the AD conversion at the different timings. Accordingly, even when the potential of the line applying the common potential to other comparison units fluctuates by the change of the comparison result signal of any comparison unit, it is possible to suppress the decrease of the operational precision of the other comparison units.

Even in the embodiment, similarly to Embodiment 1, as compared with the case where all the pixels 100 simultaneously start the AD conversion, it is difficult to align the timings when the signal value of the comparison result signal CMP of each pixel 100 is changed. Accordingly, it is possible to reduce the fluctuation of the potential of the power supply voltage VDD caused by the change of the signal value of the comparison result signal CMP. As a result, it is possible to suppress the decrease of the operational precision of other comparison units, even when the potential of the line applying the common potential to the other comparison units fluctuates by the change of the comparison result signal of any comparison unit.

Embodiment 3

In this embodiment, the pixel 100 performs correlated double sampling (hereinafter, referred to as CDS).

Disposition of a plurality of blocks having the pixels 100 may be the same as FIG. 1.

Figure 10:
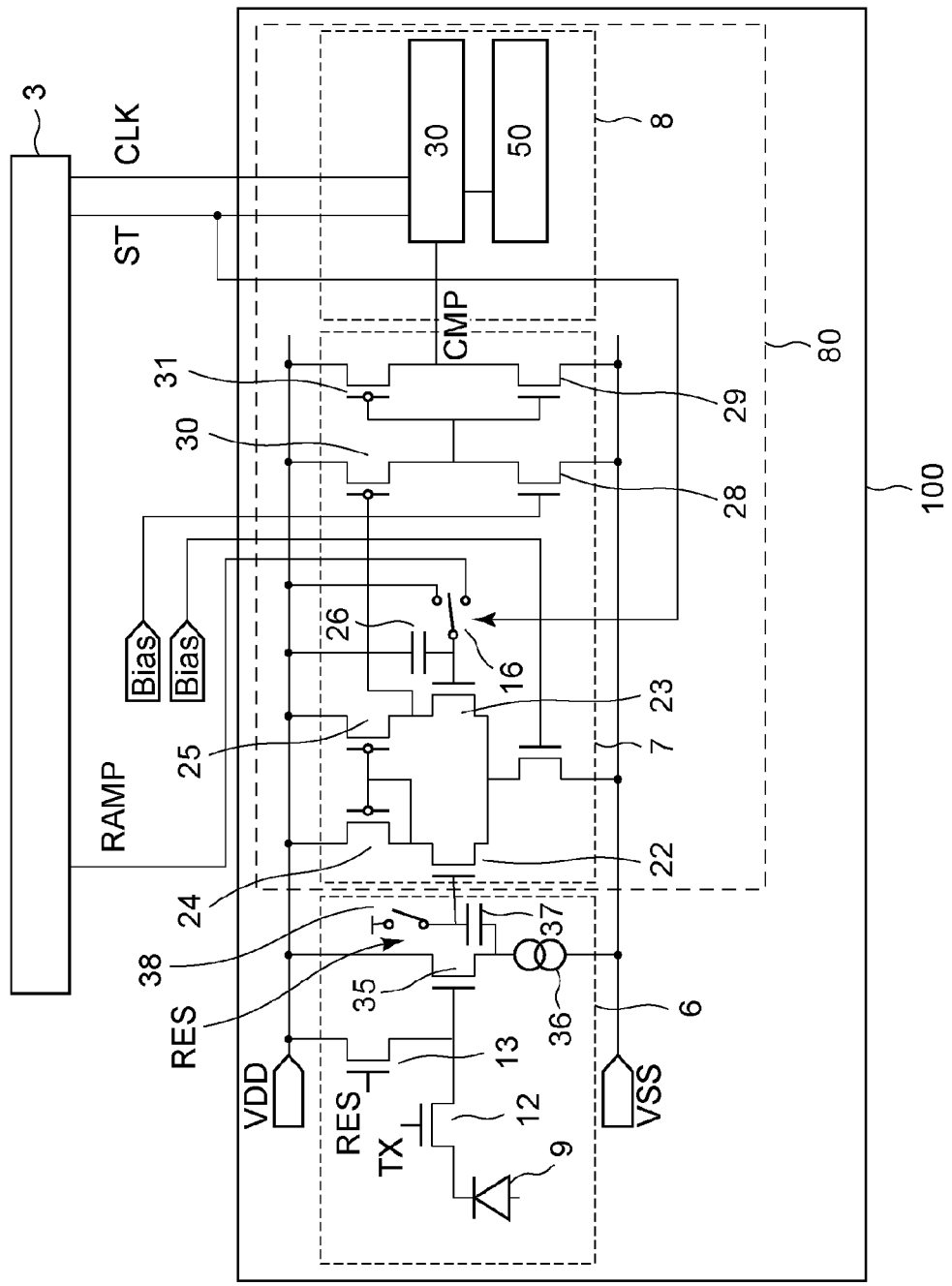
FIG. 10 is a schematic diagram illustrating another example of a configuration of a pixel.

FIG. 10 illustrates an example of a configuration of the pixel 100 of the embodiment. In FIG. 10, the same reference signs as in FIG. 2 are given to members having the same function as the pixel 100 of FIG. 2 described in Embodiment 1.

The pixel 100 exemplified in FIG. 10 is different from the pixel 100 exemplified in FIG. 2, in having an amplification MOS transistor 35, a current source 36 that supplies current to the amplification MOS transistor 35, and a capacitor 37 that is provided between the amplification MOS transistor 35 and the input MOS transistor 22. In addition, the pixel 100 exemplified in FIG. 10 is different from the pixel 100 exemplified in FIG. 2, in having a switch 38 that resets the potential of the electrode on the input MOS transistor 22 side of the capacitor 37. The switch 38 is controlled by a reset signal RES supplied by the vertical scanning circuit 2. In addition, the pixel 100 exemplified in FIG. 10 is different from the pixel 100 exemplified in FIG. 2, in having an N memory 50 that holds a count signal based on a noise signal in the memory unit 8. The other configuration may be the same as that of the pixel 100 exemplified in FIG. 2. The control electrode of the amplification MOS transistor 35 is a charge holding unit that holds signal charges of the embodiment.

Figure 11:
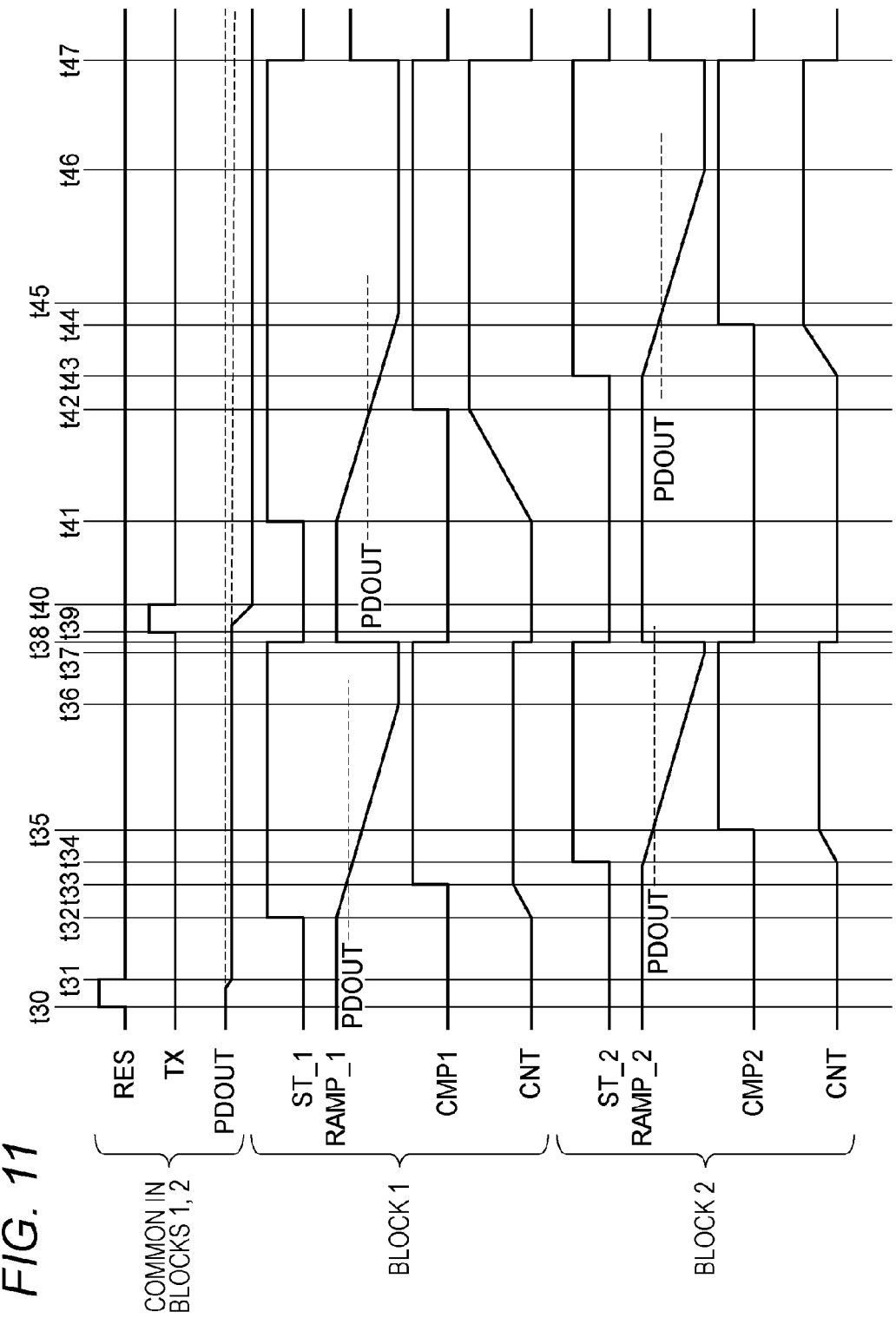
FIG. 11 is a timing chart illustrating another example of the operation of the image pickup device.

Next, FIG. 11 is a timing chart illustrating an example of an operation of the image pickup device having the pixel 100 exemplified in FIG. 10.

In a period from the time t30 to the time t31, the vertical scanning circuit 2 allows the reset signal RES supplied to the pixels 100 belonging to the block 1 and the block 2 to be in the H level, and resets the potential of the control electrode of the amplification MOS transistor 35. By allowing the reset signal RES to be in the H level, the switch 38 is in a conducting state, and the charges of the capacitor 37 are reset. When the reset signal RES is changed from the H level to the L level, the switch 38 is in the non-conducting state. Accordingly, the capacitor 37 holds the signal output from the amplification MOS transistor 35 when the reset signal RES is changed from the H level to the L level. A signal obtained by subtracting the signal held in the capacitor 37 at the time t31 from the signal output by the amplification MOS transistor 35 is transmitted to the input MOS transistor 22. In a period from the time t31 to the time t39, the photoelectric conversion unit 9 generates signal charges based on incident light.

At the time t32, the AD signal supply unit 3 allows the AD start signal ST_1 supplied to the block 1 to be in the H level. Accordingly, the AD signal supply unit 3 starts changing the potential depending on the time of the ramp signal RAMP_1 supplied to the block 1.

For example, the signal value of the comparison result signal CMP of the pixel 100-1 belonging to the block 1 is changed to the H level at the time t33. The counter 30 of the pixel 100-1 holds the count signal CNT at this time.

At the time t34, the AD signal supply unit 3 allows the AD start signal ST_2 supplied to the block 2 to be in the H level.

Accordingly, the AD signal supply unit 3 starts changing the potential depending on the time of the ramp signal RAMP_2 supplied to the block 2.

For example, the signal value of the comparison result signal CMP of the pixel 100-3 belonging to the block 2 is changed to the H level at the time t35. The counter 30 of the pixel 100-3 holds the count signal CNT at this time.

At the time t36, the AD signal supply unit 3 stops changing the potential depending on the time of the ramp signal RAMP_1.

At the time t37, the AD signal supply unit 3 stops changing the potential depending on the time of the ramp signal RAMP_2. Accordingly, each pixel 100 holds the count signal based on the noise signal output from the amplification MOS transistor 35. The count signal is represented by a digital N signal. The digital N signal is transmitted from the counter 30 to the N memory 50.

Thereafter, at the time t38, the AD signal supply unit 3 allows the AD start signals ST_1 and ST_2 to be in the L level. Accordingly, the potentials of the ramp signals RAMP_1 and RAMP_2 supplied to the block 1 and the block 2 are reset, and the counter 30 of each pixel 100 is also reset.

In the period from the time t39 to the time t40, the vertical scanning circuit 2 allows the transmission signals TX supplied to the pixels 100 of the block 1 and the block 2 to be in the H level. Accordingly, the signal charges generated by the photoelectric conversion unit 9 are transmitted to the control electrode of the amplification MOS transistor 35. The amplification MOS transistor 35 outputs a signal based on the potential of the control electrode. This signal is represented as a photoelectric conversion signal. A signal of difference between the photoelectric conversion signal and the signal held in the capacitor 37 at the time t31 is given to the input MOS transistor 22.

At the time t41, the AD signal supply unit 3 allows the AD start signal ST_1 supplied to the block 1 to be in the H level. Accordingly, the AD signal supply unit 3 starts changing the potential depending on the time of the ramp signal RAMP_1 supplied to the block 1.

For example, the signal value of the comparison result signal CMP of the pixel 100-1 belonging to the block 1 is changed to the H level at the time t42. The counter 30 of the pixel 100-1 holds the count signal CNT at this time.

At the time t43, the AD signal supply unit 3 allows the AD start signal ST_2 supplied to the block 2 to be in the H level. Accordingly, the AD signal supply unit 3 starts changing the potential depending on the time of the ramp signal RAMP_2 supplied to the block 2.

For example, the signal value of the comparison result signal CMP of the pixel 100-3 belonging to the block 2 is changed to the H level at the time t44. The counter 30 of the pixel 100-3 holds the count signal CNT at this time.

At the time t45, the AD signal supply unit 3 stops changing the potential depending on the time of the ramp signal RAMP_1.

At the time t46, the AD signal supply unit 3 stops changing the potential depending on the time of the ramp signal RAMP_2. Accordingly, each pixel 100 holds the count signal based on the signal output from the amplification MOS transistor 35. The count signal is represented as a digital S signal. The pixel 100 outputs a signal of difference between the digital N signal held in the N memory 50 and the digital S signal held in the counter 30. Accordingly, it is possible to output a signal obtained by subtracting a noise component from the digital S signal.

Thereafter, at the time t38, the AD signal supply unit 3 allows the AD start signals ST_1 and ST_2 to be in the L level.

Accordingly, the potentials of the ramp signals RAMP_1 and RAMP_2 supplied to the block 1 and the block 2 are reset. In addition, the counter 30 of each pixel 100 is reset.

The image pickup device of the embodiment performs the first CDS using the capacitor 37, and the second CDS of subtracting the digital N signal from the digital S signal. Accordingly, the pixel 100 can output a satisfactory digital signal with a less noise component.

In addition, a signal range of the noise signal taken by each pixel 100 tends to be narrow as compared with the signal range of the photoelectric conversion signal. That is, when all the pixels 100 perform the AD conversion of the noise signal all together, it is easy to align the timing when the signal value of the comparison result signal CMP of each pixel 100 is changed as compared with the case of performing the AD conversion of the photoelectric conversion signal. In the embodiment, similarly to Embodiment 1, the timings when the signal values of the AD start signals ST are changed from the L level to the H level are different between the blocks adjacent to each other. The effect of reducing the fluctuation of the potential of the power supply voltage VDD obtained thereby tends to be significant in the case of performing the AD conversion of the noise signal, as compared with the case of performing the AD conversion of the photoelectric conversion signal.

Embodiment 4

This embodiment is a type of the image pickup device having the counter 30-2 for outputting the count signal, which is common in the plurality of pixels 100.

Disposition of a plurality of blocks having the pixels 100 may be the same as FIG. 1.

Figure 12:
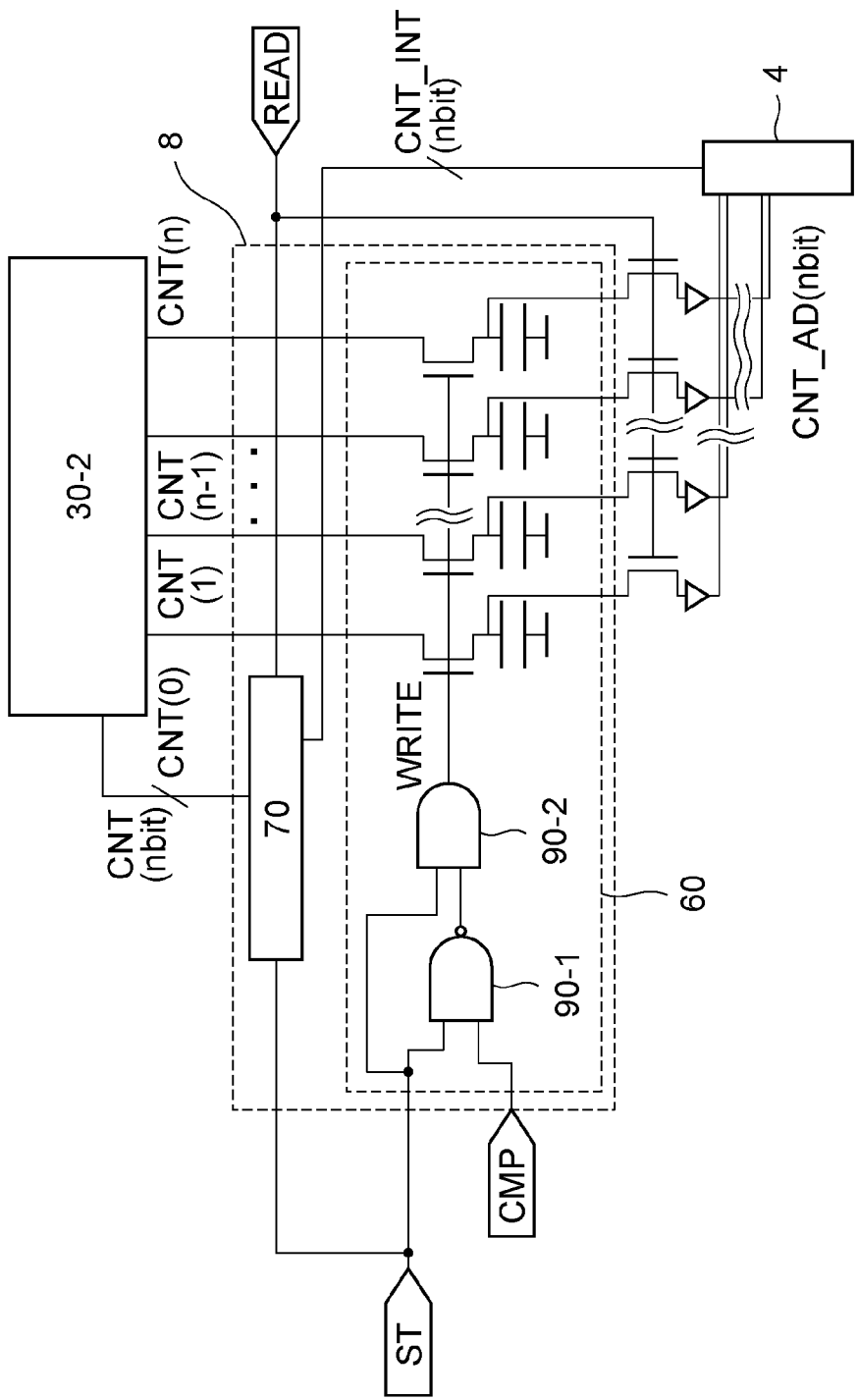
FIG. 12 is a schematic diagram illustrating another example of the image pickup device.

FIG. 12 illustrates a configuration of a memory unit 8 of a pixel 100 of the embodiment. In the pixel 100 of the embodiment, the analog signal output unit 6 and the comparison unit 7 may have the same configuration as the pixel 100 exemplified in FIG. 2. The memory unit 8 of the pixel 100 of the embodiment includes a NAND circuit 90-1, an AND circuit 90-2, an AD conversion memory 60, and an initial value memory 70. As both of the AD conversion memory 60 and the initial value memory 70, DRAMs may be used. The AD conversion memory 60 is a count signal holding unit that holds a count signal CNT on the basis of a comparison result signal CMP, of the embodiment. The NAND circuit 90-1 outputs a signal obtained by reversing a logical sum of the AD start signal ST and the comparison result signal CMP, to the AND circuit 90-2. The AND circuit 90-2 outputs a logical sum of the AD start signal ST and the output of the NAND circuit 90-1, as a count holding signal WRITE. When the count holding signal WRITE is changed from the H level to the L level, the AD conversion memory 60 holds the count signal CNT output from the counter 30-2. Hereinafter, the count signal CNT is represented as an AD conversion signal CNT_AD.

For the operations of the NAND circuit 90-1 and the AND circuit 90-2, a truth-value table is represented in Table 1.

TABLE 1

| AD Start Signal ST | Comparison Result Signal CMP | Output of NAND circuit 90-1 | Output of AND circuit 90-2 WRITE |
|---|---|---|---|
| L | L | H | L |
| L | H | H | L |
| H | L | H | H |
| H | H | L | L |

The initial value memory 70 holds the count signal CNT output from the counter 30-2 when the signal value of the AD start signal ST is changed from the L level to the H level. The count signal is represented by an initial count signal CNT_INT. The AD signal supply unit 3 outputs a memory control signal READ to the AD conversion memory 60 and the initial value memory 70. When the memory control signal READ is in the H level, the AD conversion memory 60 and the initial value memory 70 output the AD conversion signal CNT_AD and the initial count signal CNT_INT to the pixel signal reading unit 4, respectively.

Figure 13:
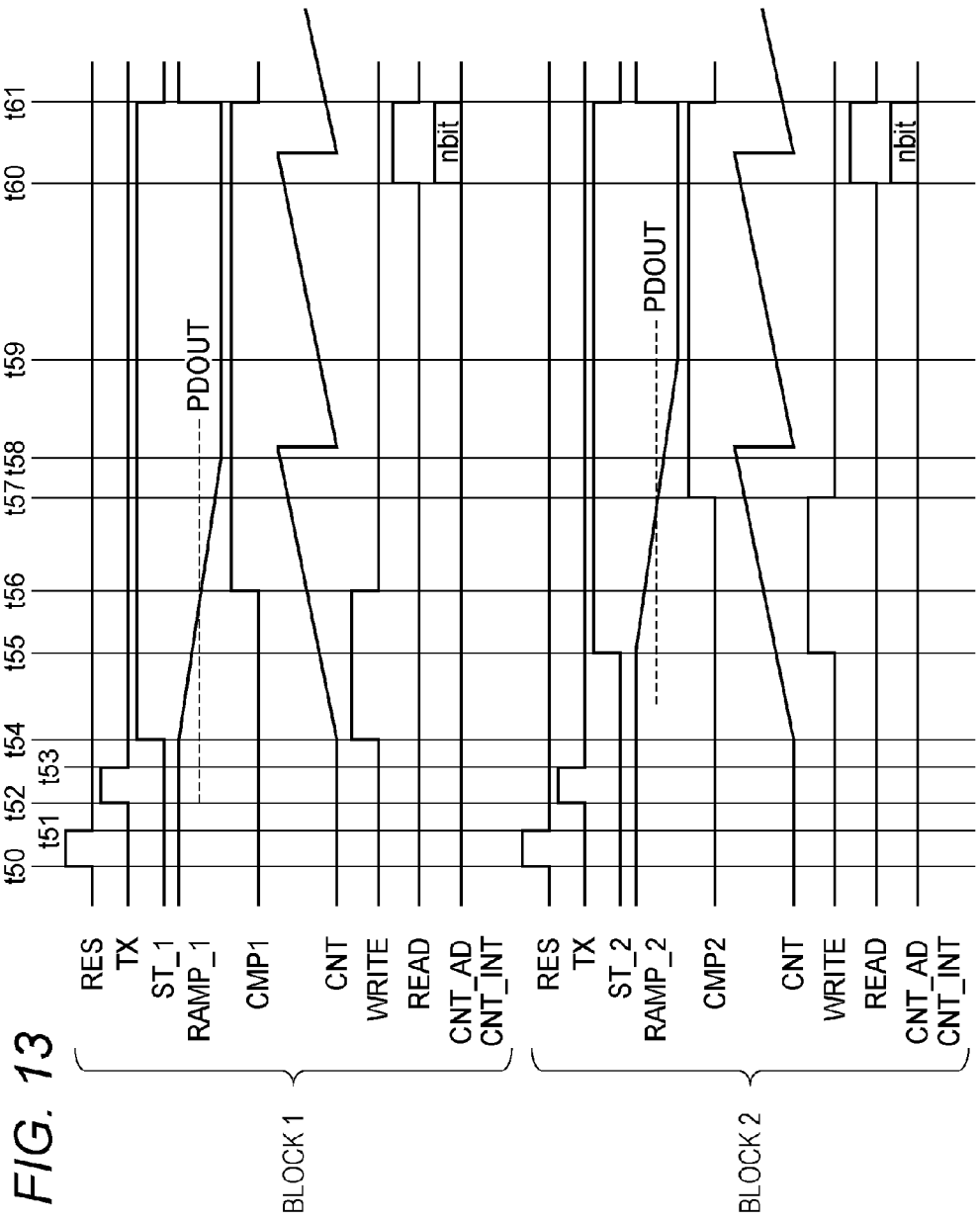
FIG. 13 is a timing chart illustrating another example of the operation of the image pickup device.

FIG. 13 is a timing chart illustrating an example of an operation of the image pickup device having the pixels 100 having the memory unit 8 exemplified in FIG. 12. The counter 30-2 of the embodiment counts the clock signal CLK, and returns to the initial value when the count signal CNT reaches a predetermined signal value. The counter 30-2 performs a cyclic operation of counting the clock signal CLK again. It is preferable that a period (hereinafter, referred to as a cyclic period of the counter 30-2) in which the count signal CNT of the counter 30-2 returns to the initial value and then returns to the initial value again be longer than a period from the start to the stop of the change of the potential depending on the time of the ramp signal RAMP. When the cyclic period of the counter 30-2 is shorter than a period from the start to the end of the change of the potential depending on the time of the ramp signal RAMP, the following problem may occur. That is, the obtainable AD conversion signals CNT_AD have the same signal value even when the amounts of signal charges of the photoelectric conversion units 9 are different.

In a period from the time t50 to the time t51, the vertical scanning circuit 2 allows the reset signals RES supplied to the pixels 100 of the block 1 and the block 2 to be in the H level. Accordingly, the potential of the control electrode of the input MOS transistor 22 is reset.

In a period to the time t52, the photoelectric conversion unit 9 generates signal charges based on incident light.

In a period from the time t52 to the time t53, the transmission signals TX supplied to the pixels 100 of the block 1 and the block 2 are allowed to be in the H level. Accordingly, the signal charges generated by the photoelectric conversion unit 9 are transmitted to the control electrode of the input MOS transistor 22.

At the time t54, the AD signal supply unit 3 allows the AD start signal ST_1 supplied to the pixel 100 of the block 1 to be in the H level. Accordingly, the AD signal supply unit 3 starts changing the potential depending on the time of the ramp signal RAMP_1 supplied to the pixel 100 of the block 1. In addition, the counter 30-2 starts outputting the count signal CNT obtained by counting the clock signal CLK, to the pixels 100 of the block 1 and the block 2. In addition, the initial value memory 70 of the pixel 100 of the block 1 holds the count signal CNT at this time. The count holding signal WRITE of the pixel 100 of the block 1 is in the H level.

At the time t55, the AD signal supply unit 3 allows the AD start signal ST_2 supplied to the pixel 100 of the block 2 to be in the H level. Accordingly, the AD signal supply unit 3 starts changing the potential depending on the time of the ramp signal RAMP_2 supplied to the pixel 100 of the block 2, and the initial value memory 70 of the pixel 100 of the block 2 holds the count signal CNT at this time. The count holding signal WRITE of the pixel 100 of the block 2 is in the H level.

For example, at the time t56, the signal value of the comparison result signal CMP1 of the pixel 100-1 is changed from the L level to the H level. Accordingly, the count holding signal WRITE of the pixel 100-1 is in the L level. Accordingly, the AD conversion memory 60 of the pixel 100-1 holds the count signal CNT at the time t56. That is, the AD conversion memory 60 of the pixel 100-1 holds the AD conversion signal CNT_AD.

For example, at the time t57, the signal value of the comparison result signal CMP2 of the pixel 100-3 is changed from the L level to the H level. Accordingly, the count holding signal WRITE of the pixel 100-3 is in the L level. Accordingly, the AD conversion memory 60 of the pixel 100-3 holds the count signal CNT at the time t57. That is, the AD conversion memory 60 of the pixel 100-3 holds the AD conversion signal CNT_AD.

At the time t58, the AD signal supply unit 3 stops changing the potential depending on the time of the ramp signal RAMP_2 supplied to the pixel 100 of the block 2.

At the time t59, the AD signal supply unit 3 stops changing the potential depending on the time of the ramp signal RAMP_2 supplied to the pixel 100 of the block 2.

At the time t60, the AD signal supply unit 3 allows the memory control signal READ output to the pixels 100 of the first row to be in the H level. Accordingly, the AD conversion signal CNT_AD and the initial count signal CNT_INT are output from the pixels 100 of the first row.

At the time t61, the AD signal supply unit 3 allows the AD start signals ST_1 and ST_2 and the memory control signal READ to be in the L level.

When the memory control signal READ given by the AD signal supply unit 3 is in the H level, each pixel 100 sequentially outputs the AD conversion signal CNT_AD and the initial count signal CNT_INT. An output signal processing unit provided outside the image pickup device arithmetically operates and acquires a digital signal based on the signal charges generated by the photoelectric conversion unit 9 of each pixel 100, by the AD conversion signal CNT_AD and the initial count signal CNT_INT. The arithmetic operation processing may be performed in each pixel 100, and each pixel 100 may output a signal after the arithmetic operation.

Even in the embodiment, similarly to Embodiment 1, as compared with the case where all the pixels 100 simultaneously start the AD conversion, it is difficult to align the timings when the signal value of the comparison result signal CMP of each pixel 100 is changed. Accordingly, it is possible to reduce the fluctuation of the potential of the power supply voltage VDD caused by the change of the signal value of the comparison result signal CMP.

In the embodiment, the type of performing the first CDS and the second CDS using the pixel 100 having the amplification MOS transistor 35, the current source 36, and the capacitor 37 has been described. However, instead of the pixel 100 exemplified in FIG. 10, the second CDS may be performed using the pixel 100 described with reference to FIG. 2 of Embodiment 1. Even in this type, it is possible to obtain the digital S signal excluding the noise component of the pixel 100 and the component of characteristic dispersion of the comparison unit 7 occurring among the plurality of pixels 100.

Embodiment 5

Figure 14:
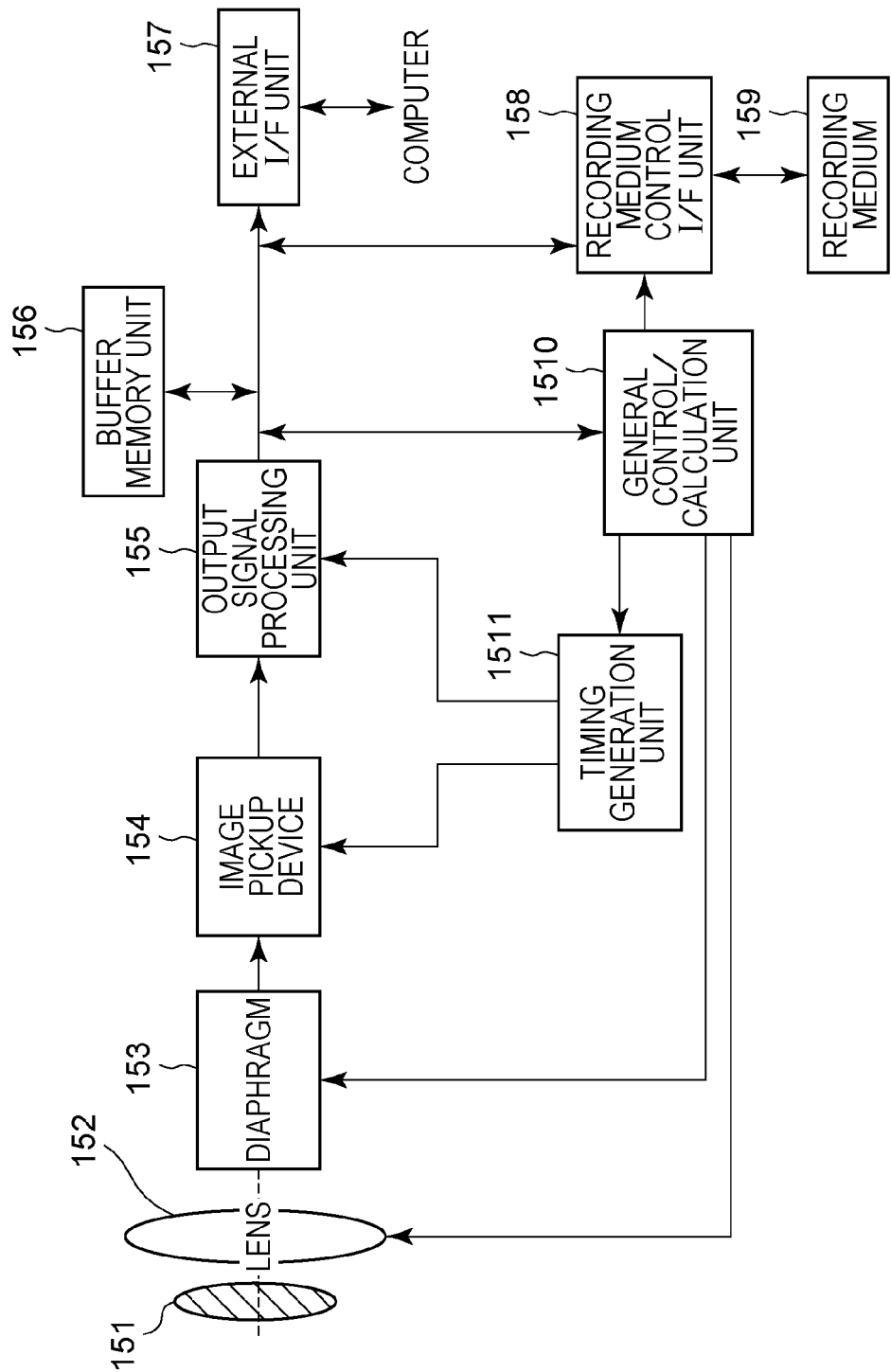
FIG. 14 is a schematic diagram illustrating an example of an image pickup system.

An embodiment in which the image pickup device described hitherto in Embodiments 1 to 4 is applied to an image pickup system will be described. Examples of the image pickup system include a digital still camera, a digital camcorder, and a monitoring camera. FIG. 14 is a block diagram when the image pickup device is applied to the digital camera as the image pickup system.

In FIG. 14, the image pickup system includes a lens 152 that focuses an optical image of a photographic subject on the image pickup device 154, a barrier 151 that protects the lens 152, and a diaphragm 153 that varies light quantity passing through the lens 152. In addition, the image pickup system includes an output signal processing unit 155 that performs a process of an output signal output from the image pickup device 154.

The output signal processing unit 155 includes a digital signal processing unit, and performs an operation of various correction and compression on the signal output from the image pickup device 154 as necessary, to output the resultant signal.

In addition, the image pickup system includes a buffer memory unit 156 that temporarily stores image data, and a storage medium control interface unit 158 that performs recording or reading with respect to the recording medium. In addition, the image pickup system includes a detachable recording medium 159 such as a semiconductor memory that performs recording or reading of the image data. In addition, the image pickup system includes an external interface unit 157 that communicates with an external computer or the like, a general control/calculation unit 1510 that controls various operations and the whole digital camera, and the image pickup device 154. In addition, the image pickup system includes a timing generation unit 1511 that outputs various timing signals to the output signal processing unit 155. Herein, the timing signal may be input from the outside, and the image pickup system may include at least the image pickup device 154, and the output signal processing unit 155 that processes the output signal output from the image pickup device 154.

As described above, the image pickup system of the embodiment can perform the image pickup operation by applying the image pickup device 154.

In the type described in the embodiments, it is possible to provide the image pickup device in which the decrease of the operational precision of other comparison units does not easily occur, based on the change of the comparison result signal of any comparison unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-124833, filed May 31, 2012, which is hereby incorporated by reference herein in its entirety.

What is claimed is:
1. An image pickup device comprising:
a plurality of pixels that each includes
a photoelectric conversion unit that generates signal charges,
an analog signal output unit that outputs an analog signal based on the signal charges, and
an analog-digital conversion unit, that includes a comparison unit for outputting a comparison result signal obtained by comparing the analog signal with a reference signal, and converts the analog signal into a digital signal based on the comparison result signal; and
a control unit that controls timings of starting operations of comparing the analog signal with the reference signal to be different among the plurality of comparison units to which power supply voltage is applied through a common line,
wherein a part of a period in which a part of the plurality of comparison units each compares the analog signal with the reference signal overlaps with a part of a period in which another part of the plurality of comparison units each compares the analog signal with the reference signal.

2. The image pickup device according to claim 1, wherein the signal charges are transmitted from the photoelectric conversion unit to the analog signal output unit, and the analog signal output unit outputs the analog signal, and the plurality of pixels simultaneously transmits the signal charges from the photoelectric conversion unit to the analog signal output unit.

3. The image pickup device according to claim 1, further comprising:

a first block that includes a part of the plurality of pixels; and a second block that includes the other part of the plurality of pixels, wherein the timings of starting the operations of the comparison units provided in the plurality of analog-digital conversion units to which the analog signal is output from the analog signal output unit are different between the first block and the second block.

4. The image pickup device according to claim 3, wherein a number of pixels included in at least one of the first and second blocks is one.

5. The image pickup device according to claim 1, wherein the pixel further includes a charge holding unit, wherein the analog signal output unit outputs a noise signal as the analog signal to the comparison unit, the noise signal being a signal based on a reset potential of the charge holding unit.

6. An image pickup device comprising:

a plurality of photoelectric conversion units that generate signal charges;

a plurality of analog signal output units that are provided corresponding to the respective photoelectric conversion units and output an analog signal based on the signal charges; and a plurality of analog-digital conversion units that are provided corresponding to the respective analog signal output units each includes a comparison units that outputs a comparison result signal obtained by comparing the analog signal with a reference signal, and converts the analog signal into a digital signal based on the comparison result signal, wherein the analog signal based on the signal charges generated by the plurality of photoelectric conversion units that have finished accumulation of the signal charges at the same timing is output from each of the plurality of analog signal output units to each of the plurality of comparison units, wherein the image pickup device further comprises a control unit that controls timings of starting operations of comparing the analog signal with the reference signal to be different among the plurality of comparison units to which power supply voltage is applied through a common line, and wherein a part of a period in which a part of the plurality of comparison units each compares the analog signal with the reference signal overlaps with a part of a period in which another part of the plurality of comparison units each compares the analog signal with the reference signal.

7. The image pickup device according to claim 1, further comprising:

a plurality of signal lines for transmitting a start signal of starting comparison between the analog signal and the reference signal, from the control unit to the plurality of comparison units, wherein a part of the comparison units of the plurality of analog-digital conversion units is connected to the first signal line, and the other part of the comparison units of the plurality of analog-digital conversion units is connected to the second signal line for transmitting the start signal at a timing different from the timing of transmitting the start signal through the first signal line.

8. The image pickup device according to claim 6, further comprising:

a plurality of signal lines for transmitting a start signal of starting comparison between the analog signal and the reference signal, from the control unit to the plurality of comparison units, wherein a part of the comparison units of the plurality of analog-digital conversion units is connected to the first signal line, and the other part of the comparison units of the plurality of analog-digital conversion units is connected to the second signal line for transmitting the start signal at a timing different from the timing of transmitting the start signal through the first signal line.

9. The image pickup device according to claim 8, further comprising:

a plurality of pixels that include the photoelectric conversion unit and the analog-digital conversion unit;

a first block that includes a part of the plurality of pixels; and a second block that includes another part of the plurality of pixels, wherein each of the comparison units included in the first block is connected to the first signal line, and each of the comparison units included in the second block is connected to the second signal line.

10. The image pickup device according to claim 1, wherein the reference signal is a signal with potential changed depending on time.

11. The image pickup device according to claim 10, wherein the analog-digital conversion unit further includes a counter that counts a clock signal, and the counter holds a signal of counting the clock signal as the digital signal at a timing of changing a signal level of the comparison result signal.

12. The image pickup device according to claim 10, further comprising a counter that generates a count signal obtained by counting a clock signal and commonly outputs the count signal to the plurality of analog-digital conversion units, wherein the analog-digital conversion unit further includes a count signal holding unit, and the count signal holding unit holds the count signal at a timing of changing a signal level of the comparison result signal.

13. The image pickup device according to claim 10, wherein the timing of starting the operation of comparing the analog signal with the reference signal is a timing of starting change in potential depending on time in the reference signal.

14. The image pickup device according to claim 1, further comprising a microlens, wherein the photoelectric conversion unit is provided between the analog-digital conversion unit and the microlens.

15. The image pickup device according to claim 1, wherein a plurality of pixels is provided in a matrix, each of the plurality of pixels including the photoelectric conversion unit and the analog signal output unit, and the plurality of comparison units is provided corresponding to respective columns provided with the plurality of pixels.

16. An image pickup system comprising:
the image pickup device according to claim 1; and
an output signal processing unit that processes a signal output from the image pickup device.

17. A method of driving an image pickup device that includes a plurality of pixels each including
a photoelectric conversion unit that generates signal charges,
an analog signal output unit that outputs an analog signal based on the signal charges, and
an analog-digital conversion unit that includes a comparison unit for outputting a comparison result signal obtained by comparing the analog signal with a reference signal, and converts the analog signal into a digital signal based on the comparison result signal,
wherein timings of starting operations of comparing the analog signal with the reference signal are controlled to be different among the plurality of comparison units to which power supply voltage is applied through a common line, and
wherein a part of a period in which a part of the plurality of comparison units each compare the analog signal with the reference signal overlaps with a part of a period in which another part of the plurality of comparison units each compare the analog signal with the reference signal.

18. The method of driving an image pickup device according to claim 17, wherein each of the plurality of pixels further includes a charge holding unit that holds the signal charges, the analog signal output unit outputs a noise signal as the analog signal to the comparison unit, and the noise signal is a signal based on a reset potential of the charge holding unit.

19. The method of driving an image pickup device according to claim 17,
wherein, based on a signal value of the digital signal output in advance from the image pickup device,
a part of the plurality of pixels is set to a first block, and the other part of the plurality of pixels is set to a second block, and
the timings of starting the operations of the comparison units provided in the plurality of analog-digital conversion units to which the analog signal is output are controlled to be different between the first block and the second block.

20. The method of driving an image pickup device according to claim 17, the image pickup device further comprising:
a plurality of photoelectric conversion units; and
a plurality of analog signal output units,
wherein the plurality of photoelectric conversion units finish accumulation of the signal charges at the same timing, and
each analog signal output unit outputs the analog signal to each comparison unit, each analog signal being a signal based on the signal charges generated by each of the plurality of photoelectric conversion units.

* * * * *